United States Patent Office 3,576,894
Patented Apr. 27, 1971

3,576,894
PRODUCTION OF CYCLOALKENES
Michailas Genas and Thomas Rüll, Paris, France, assignors to Societe Anonyme dite: Aquitaine-Organico, Paris, France
Filed Feb. 5, 1968, Ser. No. 702,771
Claims priority, application France, Feb. 3, 1967, 93,534; Nov. 29, 1967, 130,273
Int. Cl. C07c 5/02
U.S. Cl. 260—666    22 Claims

ABSTRACT OF THE DISCLOSURE

This invention relates to a process for the rapid selective hydrogeneation of cycloalkapolyenes, particularly those having from 8 to 20 atoms of carbon. The hydrogenation is performed at a temperature of from about 150° to about 220° C. under a hydrogen partial pressure of from about 1 to about 50 atm. and in the presence of a catalyst comprising divided nickel (preferably on a supporting material) which has previously been sulphided by heating with carbon disulphide until the ratio by weight is Ni/S (combined) is from 8 to 30. Preferably the sulphiding temperature is above 200° C., and preferably between 225° and 250° C., while the proportion of catalyst on the supporting material is preferably from about 0.9 to about 9 parts by weight of nickel per 100 parts by weight of the cycloalkapolyene to be hydrogenated.

BACKGROUND OF THE INVENTION

The present invention relates to an improved process for the production of cycloalkenes by hydrogenation of cycloalkapolyenes. It is particularly concerned with the hydrogeneration of cycloalkadienes and cycloalkatrienes having more than 6 ctrbon atoms, and particularly with those having from 8 to 24 carbon atoms. The invention also provides a special catalyst for carrying the hydrogenation process into effect.

The cycloalkenes, and particularly cyclooctenes and cyclododecenes, are of industrial importance as starting materials for the manufacture of various compounds, such as for example, suberic and dodecanedoic acids, epoxy-1,2 - cyclododecane and epoxy - 1,2 - cyclooctane, cyclo-octane and cyclodecane carboxylic acids, and various other useful compounds. A proposal has already been made to manufacture cycloalkenes from corresponding cycloalkapolyenes some of which are reasonably accessible as industrial materials at the present time. For example, cyclo-1,5,9-dodecatriene and cyclo-1,5-octadiene can be obtained by cyclic obligomerization of butadiene in the presence of complexes of the transition metals (G. Wilke, Angewandte Chemie, 7th January 1963, page 10). Other cycloalkadienes and cycloalkatrienes can be obtained by the cyclic oligomerization of pentadienes, particularly isoprene. It has also been proposed to convert such polyenes into he corresponding alkenes by hydrogenating them in the presence of a nickel sulphide catalyst, as described in, for example, French patent specification No. 1,393,252. However, the reaction is slow, and hydrogenation has to take place for at least about 20 hours. On the other hand, if the method of hydrogenation at a temperature between 50° and 250° C., in the presence of nickel which has previously been sulphided with organo-thio compounds, as described in French patent specification No. 1,331,283, is applied to the cycloalkapolyenes, selective hydrogenation is not obtained and if cycloalkenes are formed at all, they are produced with very low yields.

The present invention makes it possible for the aforementioned cycloalkapolyenes to be converted into cycloalkenes by selective hydrogenation and with excellent yields. It enables this operation to be carried out much more economically and more quickly, for example, in a time 10 times shorter than by the process using nickel sulphide which is referred to above.

The industrial applicability of the process of the invention is confirmed by its economic character. Actually, it is possible to use small proportions of catalyst, of the order of 1 to 90% by weight of nickel, relative to the weight of product to be hydrogenated, and it is possible to achieve a rapid hydrogenation in a time ranging from 45 minutes to less than 7 hours, with a yield higher than 84%.

The process according to he invention consists in hydrogenating at least one cycloalkapolyene at a temperature between 150 and 220° C., under a partial hydrogen pressure of 1 to 50 atm. in the presence of a small proportion of a catalyst comprising divided nickel which has previously been sulphided by heating the nickel with carbon disulphide at a temperature above 200° C., and preferably above 224° C., the proportions of each being such that the ratio by weight of the nickel to the combined sulphur is between about 8:1 and about 30:1.

Preferably, the catalyst used has been heated for from about 1 to about 3 hours during its preliminary treatment with carbon disulphide. Preferably the temperature is between 200° C. and 300° C. or more advantageously between 225° and 250° C.

The ratio by weight between the total nickel in the catalyst and the sulphur combined with the nickel is most advantageously of the order of 10:1 to 20:1. More specifically, there is preferably from 5 to 10 g. of sulphur combined with 100 g. of nickel.

The excellent results which are obtained by the process according to the invention are quite unexpected by comparison with the prior art. The prior art indicates that only nickel sulphide (NiS and/or $Ni_2S_3$) is capable of giving good yields in the preparation of cycloalkenes (as described in French patent specification No. 1,393,252) and that nickel treated with $CS_2$ does not even permit isoprene to be hydrogenated (see French patent specification No. 1,331,283—Table II). However, the present invention makes possible the use of carbon disulphide, which is one of the cheapest sulphidation agents.

The sulphidation of nickel for use as a catalyst according to the present invention, is preferably effected in the presence of hydrogen, and preferably under a pressure of 5 to 50 atm. The quantity of carbon disulphide which can be calculated in advance, is such that the content of sulphur in the sulphided nickel is consistent with the ratio by weight Ni/S which is in the range of 8 to 30. The reaction of $CS_2$ with Ni is practically quantitative under the working conditions specified according to the invention. Although the carbon disulphide can be mixed with the divided nickel and heated with the latter in a closed chamber, a more practical procedure consists in placing the two substances in an inert liquid and in particular in a relatively volatile saturated hydrocarbon such as pentane, hexane, heptane or octane.

The active nickel which is employed for the preparation of the catalyst can be obtained for example by the reduction with hydrogen of nickel oxide previously deposited on a porous support. A deposit of nickel oxide of the aforementioned type can be obtained by impregnating the support with a solution of nickel nitrate. The impregnated support is then calcined. Divided nickel can also be prepared by the thermal decomposition of an organic acid salt, in particular nickel formate. Other means for the preparation of divided nickel are known and are suitable.

When the temperature at which the nickel is heated with carbon disulphide (if desired, in the presence of an inert liquid) is of the order of 225 to 250° C., sulphidation is generally achieved in about two hours. If the treatment with carbon disulphide is carried out at a temperature below 200° C., the sulphided nickel does not have sufficient catalytic activity. In fact, sulphidation at 180° C., for example, yields a substance which is 5 to 6 times less active than when sulphidation is carried out at 225° C., which means that the hydrogenation of cycloalkapolyenes using a substance of the aforementioned type as catalyst requires 5 to 6 times as much time as with a catalyst obtained under the conditions required by the present invention, i.e. a temperature of 225° C.

Moreover, the rate of hydrogenation decreases considerably when the weight ratio Ni/S in the catalyst is below 8.

Since the catalyst is sensitive to oxidation, the catalyst must be kept in air-free conditions; however, it can be used for successive hydrogenation reactions without regeneration. Furthermore, its activity is such that it is sufficient to employ proportions of catalyst such that 1 to 9 parts by weight of nickel are used per 100 parts by weight of product to be hydrogenated.

The process for the production of cycloalkenes according to the invention can employ various cycloalkapolyenes as starting material. The cycloalkapolyenes may be used individually or in admixture. As indicated above, the process is particularly applicable to the hydrogenation of cycloalkadienes and cycloalkatrienes containing from 8 to 24 carbon atoms in the molecule. One class of starting material which is of very great importance industrially is the cyclo-oligomers of butadiene and/or of isoprene, and especially cyclo-1,5,9-dodecatriene and cyclo-1,5-octadiene.

For the hydrogenation of these latter compounds, it is preferable to select a temperature in the range from about 160° to about 170° C. However, temperatures anywhere in the wider range of 150° to 220° C. can be used. Below 150° C., the hydrogenation is very slow, while above 220° C. the yield decreases because of the formation of secondary products, mainly aromatic hydrocarbons.

The selective hydrogenation which is part of the process according to the invention can be effected under hydrogen pressures ranging from about 1 to about 50 atm. however, it is preferably carried out under pressures from about 2 to about 10 atm. Under atmospheric pressure, the hydrogenation is too slow, while under very high pressures, the selectivity decreases. For this reason it is preferable not to exceed the limit of 50 atm. and better still not to exceed the limit of 10 atm.

SPECIFIC EMBODIMENTS

The invention is illustrated by the following non-limiting examples:

Example 1

Into a steel autoclave with a capacity of 250 ml., placed in an electric furnace and equipped with agitating means for imparting to it a sideways reciprocating movement, there is introduced 10 g. of the hydrogenation catalyst based on active nickel, which is known commercially by the name Ni 104T (sold by the Harshaw Chemical Co.). This catalyst comprises reduced nickel on a kieselguhr support with the approximate content of nickel being about 50%. The catalyst, which is supplied initially in the form of small cylinders, is crushed before being introduced into the autoclave.

In addition, 50 ml. of heptane and 0.6 ml. of carbon disulphide are introduced into the autoclave.

Hydrogen is injected into the autoclave until the pressure is 10 atm. The autoclave is then heated to 225° C., which causes the pressure to rise to approximately 30 atm. The autoclave is kept at this temperature of 225° C. with continuous agitation for 2½ hours. After this time, the autoclave is allowed to cool. The catalyst obtained from the initial catalyst which has been sulphided by the $CS_2$ was found to have a weight ratio of Ni/S of 11.

50 ml. of cyclo-1,5,9-dodecatriene were then introduced into the autoclave; 92% of this compound was comprised of the cis-trans-isomer and 8% of the trans-trans-trans-isomer. Thereafter, a temperature of 170° C. and a total pressure of 10 atm. of which about 5 atm. is the hydrogen partial pressure, were maintained in the autoclave for one hour.

After the hydrogenation step was completed, the autoclave was cooled and the gaseous phase expanded. The catalyst was then separated by filtration and the heptane was eliminated by distillation.

The composition of the residue remaining in the autoclave, as determined by chromatography in the vapor phase was found to be: 90% of cyclododecene and 10% of cyclododecane. The cyclododecene was formed by a mixture of the trans- and cis-isomers in the ratio of about 2:1.

Example 2

Example 1 was repeated with the exception that cyclododecatriene (CDT) was replaced by 50 g. of cyclo-1,5-octadiene. The reaction product obtained comprised 92% of cyclo-octene, 3% of cyclo-octadiene, 4% of cyclooctane and 1% of unspecified products.

Example 3

10 g. of catalyst Ni 104T (see Example 1) were introduced, together with 10 ml. of hexane and 0.4 ml. of carbon disulphide, into the autoclave described in Example 1. Hydrogen was then introduced under a pressure of 5 atm.

The autoclave was heated to 240° C. for 2 hours while being agitated. After cooling, the weight ratio Ni/S in the catalyst which formed was found to be 11.

The hydrogenation of 100 ml. of cyclo-1,5,9-dodecatriene was then carried out in the same autoclave over the catalyst at 160° C. and under a partial hydrogen pressure of 8 atm. for 1½ hours. After filtration to separate the catalyst and the elimination of the hexane, the reaction product obtained was comprised of 88% cyclododecene, 4% cyclododecane and 7% cyclododecadiene.

Examples 4 through 9 illustrate the influence of the sulphidation temperature on the activity of the catalyst. It was found that catalysts prepared at 225° C. were more active than those prepared at lower temperatures.

Examples 4 to 9

The procedure is as indicated in Example 1, with the exception that the sulphidation temperature used in preparing the catalyst varied between 150° and 225° C. The proportion in which the catalyst was used was such that there were 9 parts by weight of nickel to 100 parts of cyclododecatriene. The hydrogenation temperature was 165° C. Table I sets forth the yields of cyclododecene and the hydrogenation time corresponding to the various sulphidation temperatures. It was found that the best yields 85 to 90%) and the best hydrogenation rates were obtained when the catalyst was prepared at 225° C.

TABLE I

| Example | Sulphidation temperature, ° | Hydrogenation time | Yield of cyclododecene, percent |
|---|---|---|---|
| 4 | 150 | 6 hours | 1 |
| 5 | 180 | 45 minutes | 42 |
| 6 | 180 | 3 hours 30 minutes | 82 |
| 7 | 180 | 4 hour 30 minutes | 86.5 |
| 8 | 225 | 45 minutes | 89.9 |
| 9 | 225 | 60 minutes | 85.4 |

Examples 10 to 13 illustrate the variation of the rate of hydrogenation as a function of the proportion of catalyst. The time required for hydrogenation did not exceed 7 hours, even with a proportion of catalyst smaller than 1%.

Examples 10 to 13

The hydrogenation of cyclododecatriene was carried out as in Example 1, using a temperature of 165° and a catalyst which was sulphided at 225° C. The quantities of catalyst used were varied.

TABLE II

| Example | Amount of nickel contained in the catalyst per 100 parts of CDT, percent | Hydrogenation time, minutes | Yield of cyclododecene, percent |
|---|---|---|---|
| 10 | 9 | 45 | 89–90 |
| 11 | 4.5 | 90 | 86.5 |
| 12 | 1.8 | 180 | 85.5 |
| 13 | 0.9 | 420 | 84 |

Having thus described our invention, it is evident that certain obvious modifications thereto will be apaprent to the worker in the art. Accordingly, it is intended that these modifications be included as part of the invention as defined by the appended claims.

We claim:
1. In a process for the production of cycloalkenes from cycloalkapolyenes wherein at least one cycloalkapolyene having from 8 to 12 carbon atoms inclusive is hydrogenated at a temperature between 150 and 220° C. under a hydrogen partial pressure of from 1 to 50 atmospheres while in contact with a sulphided nickel catalyst, the improvement wherein said sulphided nickel catalyst comprises finely divided nickel which has previously been sulphided by heating said nickel with carbon disulphide at a tempeature above 200° C. in an amount and for such time that the ratio by weight of the nickel to the combined sulphur is between about 8:1 and about 30:1.

2. A process according to claim 1, wherein the catalyst is obtained by heating the divided nickel with carbon disulphide for from about 1 to about 3 hours.

3. A process according to claim 1, wherein the catalyst is obtained by heating the divided nickel with carbon disulphide at a temperature between 220° C. and 300° C.

4. A process according to claim 3, wherein the catalyst is obtained by heating the divided nickel with carbon disulphide at a temperature between 225° C. and 250° C.

5. A process according to claim 1, wherein the catalyst is obtained by heating the nickel and carbon disulphide in an atmosphere containing hydrogen at a pressure of from 5 to 50 atm.

6. A process according to claim 1, wherein the ratio by weight between the nickel and the combined sulphur in the catalyst is from 10:1 to 20:1.

7. A process according to claim 1, wherein the catalyst is on a silica type support.

8. A process according to claim 1, wherein the catalyst is on an alumina type support.

9. A process according to claim 1, wherein the catalyst is on a kieselguhr type support.

10. A process according to claim 1, wherein the catalyst is prepared by sulphiding nickel with carbon disulphide in an inert liquid.

11. A process according to claim 10, wherein the liquid is an alkane having from 5 to 8 carbon atoms.

12. A process according to claim 11, wherein the hydrogenation of the cycloalkapolyene is effected in said inert liquid.

13. A process according to claim 1, wherein the catalyst used contains from 0.9 to 9 parts by weight of nickel per 100 parts by weight of the cycloalkapolyene to be hydrogenated.

14. A process according to claim 1, wherein the hydrogenation temperature is from 160° to 170° C.

15. A process according to claim 1 wherein the hydrogen partial pressure during the hydrogenation is from 2 to 10 atm.

16. A process according to claim 1 wherein the cycloalkapolyene is selected from the group consisting of a cycloalkadiene and a cycloalkatriene and mixtures thereof.

17. A process according to claim 1, wherein the cycloalkapolyene is a cyclo-oligomer of butadiene.

18. A process according to claim 17, wherein the butadiene cyclo-oligomer is cyclo-1,5,9-dodecatriene.

19. A process according to claim 17, wherein the butadiene cyclo-oligomer is cyclo-1,5-octadiene.

20. A process according to claim 1, wherein the cycloalkene end-product contains cyclododecene.

21. A process according to claim 1, wherein the cycloalkane end-product contains cyclo-octene.

22. A process for making a catalyst for use in the hydrogenation of cycloalkapolyenes, which comprises sulphiding divided nickel with carbon disulphide at a temperature between about 225° C. and 250° C. in an amount and for such time that the ratio by weight between the nickel and the combined sulphur is between about 8:1 and about 30:1.

References Cited

UNITED STATES PATENTS

| 3,234,121 | 2/1966 | MacLareu | 260—667 |
| 3,251,892 | 5/1966 | Seefelder | 260—666A |
| 3,022,359 | 2/1962 | Wiese | 260—666 |
| 3,301,913 | 1/1967 | Holmes et al. | 208—143 |
| 3,309,307 | 3/1967 | Bryant | 208—143 |
| 3,493,625 | 2/1970 | Zuech | 260—666A |

DELBERT E. GANTZ, Primary Examiner

V. O'KEEFE, Assistant Examiner